March 17, 1936.  E. R. HURTIG  2,034,579
DISK FOR AGRICULTURAL IMPLEMENTS
Filed May 19, 1934
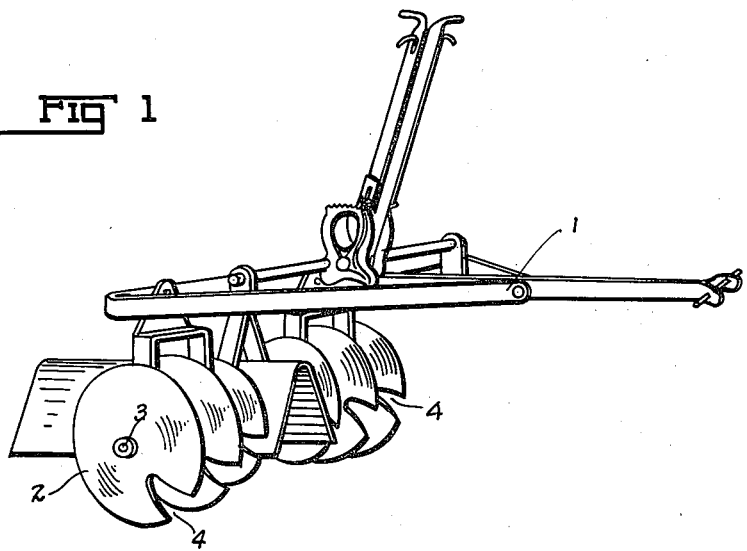
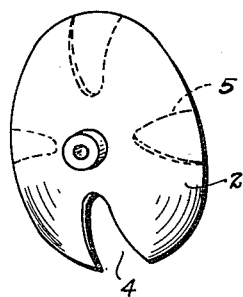
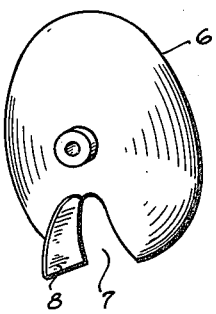
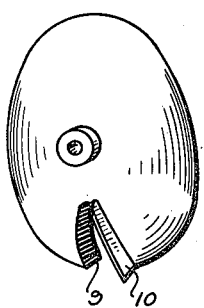
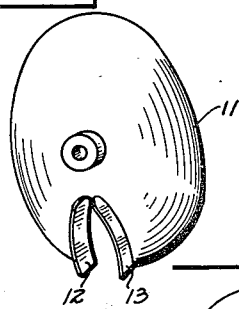
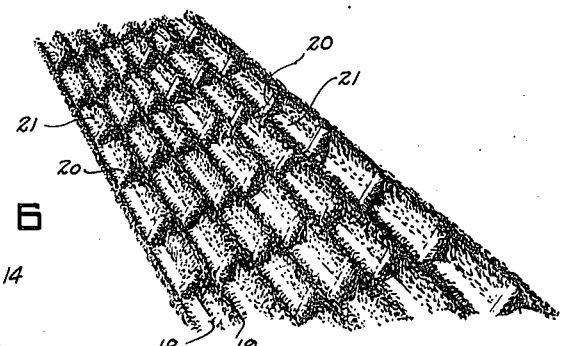
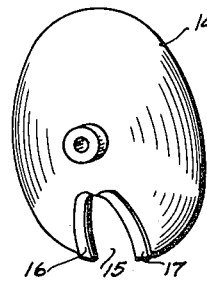
INVENTOR.
EDWARD R. HURTIG
BY Charles R Werner
ATTORNEY.

Patented Mar. 17, 1936

2,034,579

UNITED STATES PATENT OFFICE 2,034,579

DISK FOR AGRICULTURAL IMPLEMENTS

Edward R. Hurtig, Delphos, Kans.

Application May 19, 1934, Serial No. 726,492

4 Claims. (Cl. 55—30)

This invention relates to farm cultivating implements and particularly to an improved form of disk therefor.

The object of the invention is to provide a process and means for cultivating the soil whereby furrows with spaced interruptions or dams are formed, resulting in a series of pockets or traps for retaining precipitation.

To attain this end I have provided a concavo-convex disk with one or more gaps or openings along its periphery. The disks are mounted on the cultivating implement in the usual manner and are rotated either by friction with the soil or by a power drive. In actual practice the disks force the soil to one side, forming a ridge and a furrow, except where the opening in the disk contacts the ground at which point the furrow is interrupted and a dam is formed.

The advantages of my invention are clearly apparent. On sloping land, where furrows are formed by using cultivating implements with disks of known construction, the water flows down the furrow, seeking the lowest level and drains off the land, causing erosion and lessening the amount of moisture absorbed by the soil. By my process and with the use of my invention, however, land which has a high degree of slope can be cultivated and pockets formed for retaining the precipitation, avoiding erosion and making the land more fertile and productive through the additional amount of moisture absorbed.

The invention will be better understood by reference to the following description in connection with the accompanying drawing, in which:

Figure 1 is a perspective view of one form of farm cultivating implement with disks constructed in accordance with my invention, to carry out my process of cultivating the soil.

Figure 2 is a perspective view of one form of disk comprising my invention.

Figures 3, 4, 5 and 6 show modified forms of disks.

Figure 7 is a partial view of cultivated ground showing the results obtained by using my form of disk.

Referring now to the drawing by numerals of reference, I designates a farm cultivating implement having the usual controls for regulating depth and angle of cut. It is to be understood, however, that I do not wish to be limited to the use of my invention on a cultivator as illustrated, since it is obvious that the disk would accomplish the same results if applied to a harrow, plow, lister, drill or other earth working implement in which disks are employed.

The disks 2 are rotatably mounted on the axles 3 of the cultivator 1. In Figure 2 is illustrated a concavo-convex disk 2 with a substantially acute-angularly shaped gap or opening 4 in the periphery thereof. Dotted lines 5 indicate additional gaps which can be provided. As illustrated the gap 4 is wider at the periphery of the disk than toward the center, the edges of the gap converging into a sharp intersection or a curved one as shown. The edges of the gap, however, may be parallel, the size and shape of the gap or opening determining the size and shape of the dam formed in the soil.

Figure 3 shows another form of disk 6 having gap 7 and flange 8 disposed at an angle to either the convex or concave side of the disk. Figures 4 and 5 are further modifications of my invention with flanges at both edges of the gap. In Figure 4 the flanges 9 and 10 are shown disposed in opposite directions while in Figure 5 the disk 11 has flanges 12 and 13, both formed on one side of the disk, which may be either the concave or convex side.

Figure 6 illustrates a disk 14 having gap 15, similar to the opening 4 in disk 2, with reinforced edges 16 and 17. This reinforcement may be made by bending back the material removed to form the opening 15, or separate reinforcing strips may be se. irely fastened to the edges 16 and 17 to strengthen same.

In the disks shown in Figures 3, 4 and 5, the angles or flanges may be made from the material removed to form the gap, or they may be made separately and fastened to the edges of said gaps. These flanges are for the purpose of strengthening the disk as well as for assisting in the forming of dams.

In Figure 7 I have attempted to illustrate the results obtained by use of my invention. Furrows 18 and ridges 19 are periodically interrupted by dams 20, forming traps 21.

From the foregoing it will be apparent that I have provided a simple and novel process and means whereby pockets can be formed in the soil for trapping precipitation, preventing erosion incident to the draining off of the water and through the additional amount of moisture absorbed by the earth increase the fertility thereof.

It is to be understood that I do not wish to be limited to the exact details of construction shown because obviously changes could be resorted to without departing from the spirit of my invention. The distance between the dams and their size can be varied by the number of and size of gaps in the periphery of the disk as well as by the diameter of the disk and by adjusting the depth of cut. It is obvious that other means may be devised to accomplish the process specified and claimed herein. Therefore, I do not wish to be limited to the particular means shown for accomplishing said process.

What I claim as new and desire to secure by Letters Patent is:

1. A concavo-convex, furrow cutting disk provided with one or more substantially acute-angularly shaped gaps in the peripheral area thereof, whereby the furrow cutting process is interrupted at periodic intervals to create dams across the furrow, each gap having an angularly disposed flange at one or more edges thereof.

2. A concavo-convex furrow cutting disk provided with one or more substantially acute-angularly shaped gaps in the peripheral area thereof, whereby the furrow cutting process is interrupted at periodic intervals to create dams across the furrow, each gap having an angularly disposed flange at one or more edges thereof, said flange being formed of the material removed to create the gap.

3. A furrow cutting disk provided with means for periodically interrupting the furrow cutting process to create dams across the furrow, said means comprising one or more substantially acute-angularly shaped gaps in the periphery of said disk, each gap having reinforcing means at the edges thereof.

4. A furrow cutting disk provided with means for periodically interrupting the furrow cutting process to create dams across the furrow, said means comprising one or more substantially acute-angularly shaped gaps in the periphery of said disk, each gap having reinforcing means at the edges thereof, said means being formed of the material removed to create the gaps.

EDWARD R. HURTIG.